Aug. 4, 1931.  E. COOPER ET AL  1,816,826
RECORDING SPEEDOMETER
Filed April 12, 1926   2 Sheets-Sheet 1
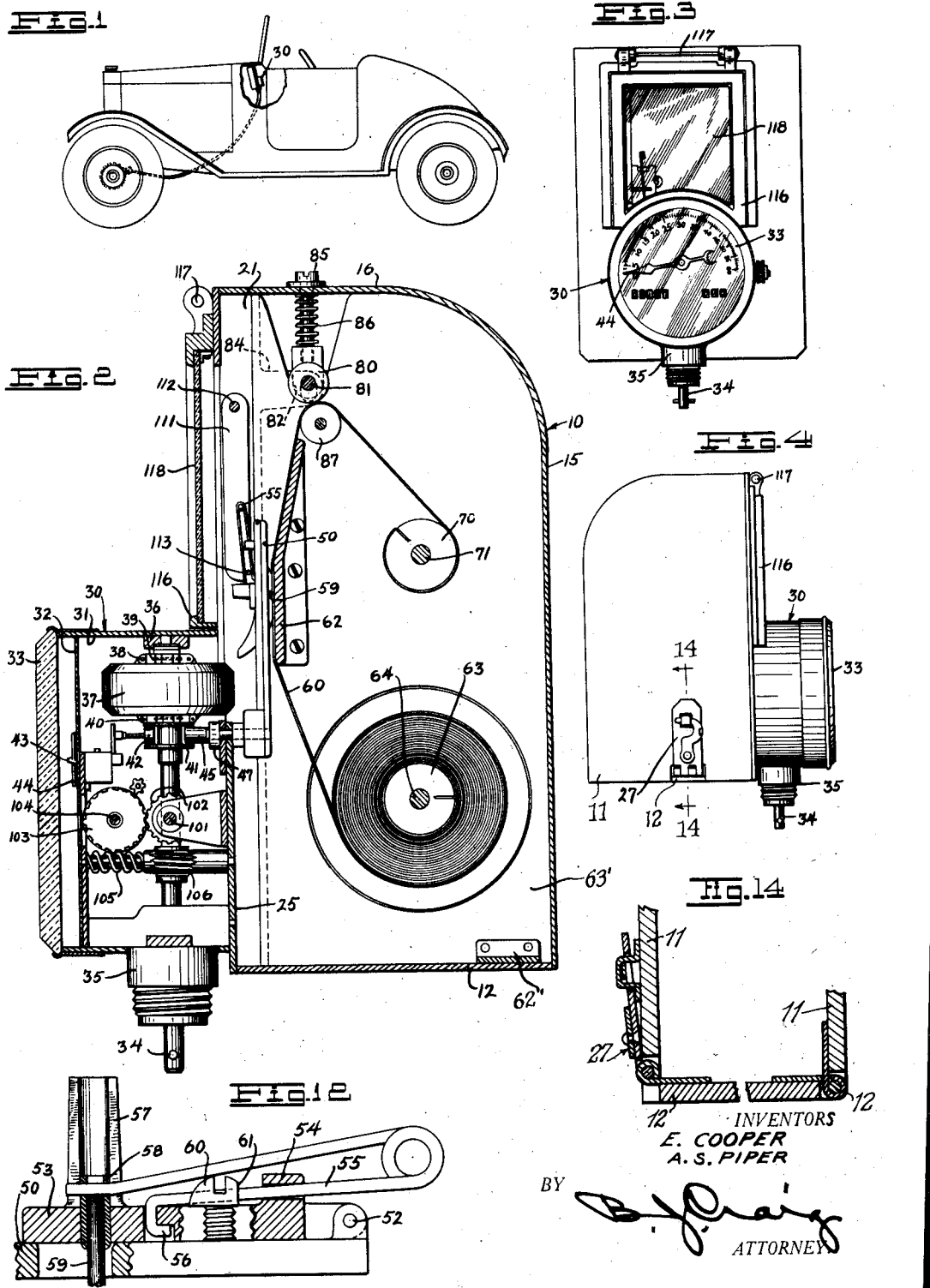

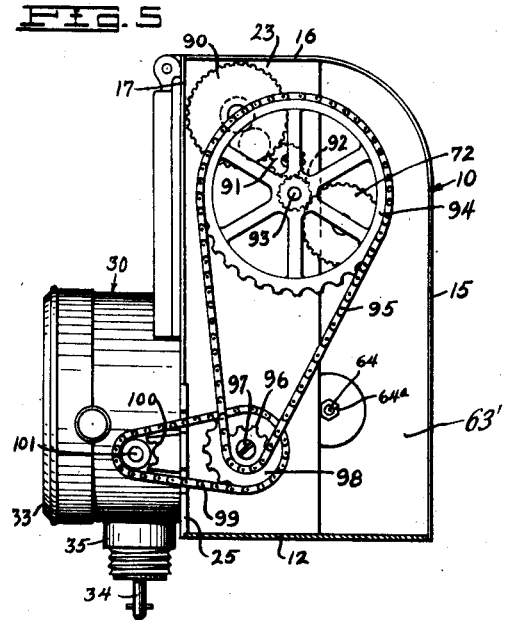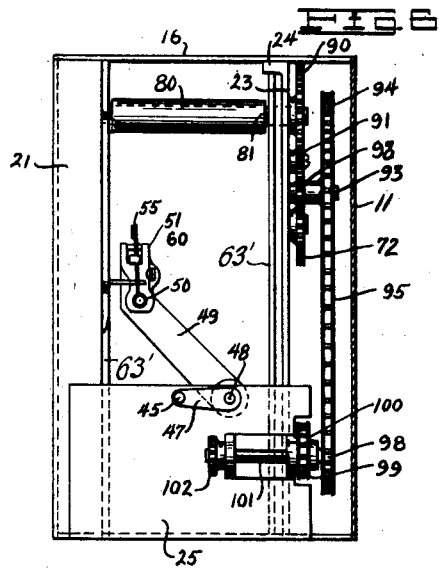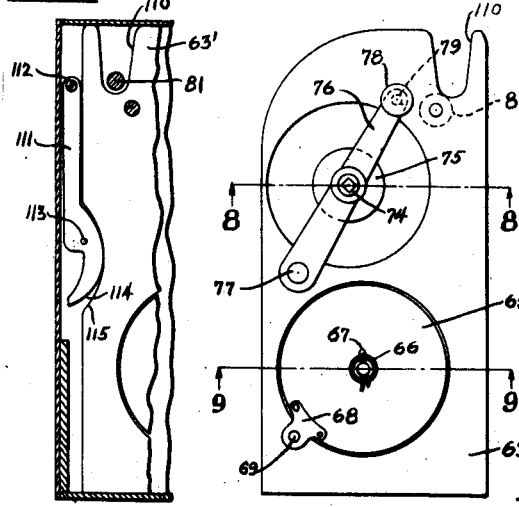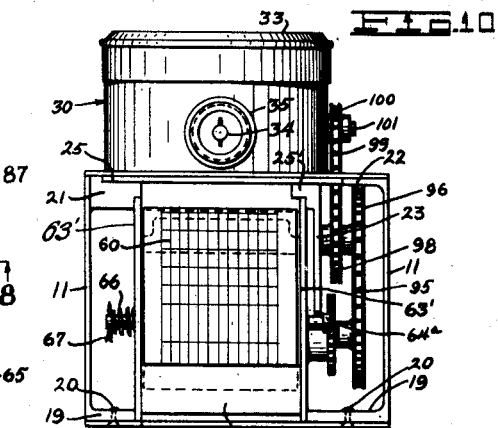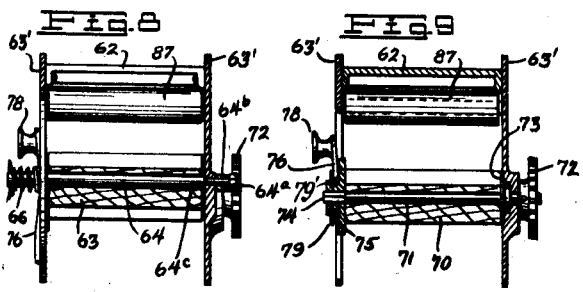

Patented Aug. 4, 1931

1,816,826

UNITED STATES PATENT OFFICE

ERNEST COOPER AND ALONZO S. PIPER, OF RIVERSIDE, CALIFORNIA

RECORDING SPEEDOMETER

Application filed April 12, 1926. Serial No. 101,281.

This invention relates to recording speedometers.

The general object of the invention is to provide an improved recording speedometer, wherein novel means is provided for driving the recording mechanism.

A further object of the invention is to provide a recording speedometer for vehicles wherein a record is made of the speed at which the vehicle is driven and wherein the record is produced on a sheet of paper which is moved by the means which drives the recording device.

Another object of the invention is to provide a combined speed indicating and recording device wherein the operating parts are of simple construction and are arranged in such a manner that the recording mechanism may be driven without interfering with the normal function of the speed indicating device.

Another object of the invention is to provide a speedometer which will record the speed of a vehicle just before it makes a sudden stop so that in case of accidents the blame can be properly placed.

Other objects of the invention will be apparent from the following description taken in connection with the accompanying drawings, wherein:

Fig. 1 is a side elevation of an automobile equipped with our invention;

Fig. 2 is a central sectional view of a speedometer embodying the features of our invention;

Fig. 3 is a top plan view of the speedometer case;

Fig. 4 is a side elevation of the speedometer case;

Fig. 5 is a view similar to Fig. 4 showing the other side of the speedometer case;

Fig. 6 is a top plan view of the speedometer case with the cover removed;

Fig. 7 is a fragmentary elevation showing the manner in which the paper rolls are supported;

Fig. 8 is a section on line 8—8, Fig. 7;

Fig. 9 is a section on line 9—9, Fig. 7;

Fig. 10 is an elevation showing the end of the casing and details of the driving mechanism;

Fig. 11 is a fragmentary section showing details of the pencil raising mechanism;

Fig. 12 is a detail view of the pencil holding mechanism,

Fig. 13 is a plan view of a portion of the recording paper, and

Fig. 14 is a section taken on line 14—14 of Fig. 4, showing the door hinging and fastening means.

Referring to the drawings by reference characters, we have shown a recording speedometer at 10. This speedometer is shown as mounted in a case which comprises side portions 11, a bottom portion 12, and a back part 15, which is curved adjacent to the upper portion thereof. The back 15 is shown as extended to form a top 16 which engages a curved part of the sides. The front of the casing near the top is closed by means of a closure member 17.

The bottom portion of each side 11 is provided with an inwardly directed flange 19 upon which the bottom member 12 is seated. This bottom member 12 is secured by suitable fastening members such as screws 20.

The upper portion of one side 11 is provided with an inwardly directed flange 21, while the other side 11 is provided with an inwardly directed flange 22.

A partition 23 extends longitudinally within the casing as shown. This partition 23 is provided at one end with a flange 24 which is secured to the top 16 of the casing. This partition 23 extends from the front of the casing rearwardly to a distance approximately equal to one-half the depth of the casing.

Across the lower portion of the front of the casing we arrange a cross member 25 which is secured at one side to the flange 21 and at the other side is secured to a flange 25' on the top of the partition member 23. This member 25 serves to hold the parts in position and also forms a support for gearing (to be presently described), and for the speedometer proper. The bottom 12 of the casing is hinged to one of the sides 11 of the casing by hinges at 26 as shown and is held closed by a catch 27 which may have a padlock or seal thereon which may be placed by traffic authorities or others. The bottom 12 acts as an abutment to hold the parts in contact with the feed roll 80 and also holds the gears in mesh.

The speedometer proper is indicated at 30 as mounted upon the cross member 25. This speedometer may be of any type and, as shown, it comprises a casing 31 having a scale face 32 thereon and having a glass cover 33 for the face. The speedometer is provided with a drive shaft 34 which is mounted in suitable bearings 35 and 36. The shaft 34 near the bearing 35 is provided with a plurality of governor weights 37 which may be mounted for radial movement in any desired manner. The weights 37 are shown as mounted on the shaft so that longitudinal movement is prevented by a link 38 and a collar 39.

At the other side the weights are fastened by means of links 40 to a grooved sliding collar member 41 which is free to move along the shaft 34 as the weights fly out due to centrifugal action. An operating member 42 fits within the groove of the collar member 41 and this operating member 42 is operatively connected to a shaft 43 on which an indicating needle 44 is mounted.

The collar member 41 also engages a pin 45 which is secured to an arm 47 which is fixed on a shaft 48 arranged to turn in the cross member 25. The shaft 48 has an arm 49 thereon to which a pencil member 50 is secured.

It will thus be apparent that when the shaft 34 is driven in any desired manner that weights 37 will cause movement of the needle 44 and will also cause movement of the arm 49 to move the recording member 50.

The end of the recording member 50 is off set as at 51 so that the recording pencil may move close to the sides of the recording paper to be presently described. The recording member 50 is shown in detail in Fig. 12 where it will be noted that the member 50 is provided with a pintle pin 52 at one end on which a hinged member 53 is mounted. The member 53 is provided with a boss 54 which is apertured to receive a spring member 55. This spring member 55 is secured at one end 56 to the member 53 and at the other end it is inserted in an aperture in a hollow boss 57 on the member 53. The hollow boss 57 accommodates a hollow cylindrical pencil lead holding member 58. To hold the lead 59 so that it will mark upon the paper the member 58 is freely movable in the hollow member 58 and the upper end of the member boss 57 and the upper end of the member 58 is apertured to receive the end of the spring 55. The hollow boss 57 is provided with slots along each side thereof and in these slots the spring member 55 moves. The normal tendency of the spring is to urge the pencil downward so that it will be urged into engagement with the paper to be presently described. In order to renew the lead the member 53 will be swung about the pintle pin 52 thus exposing the member 58. After a lead 59 is inserted the member 53 is swung to the position shown in Fig. 12. A screw 60 serves to hold the member 53 in operative position. This screw 60 has a flat face 61 and when the screw is turned to present the flat face next to the member 53 the latter can be opened.

The lead 59 is adapted to mark on a strip of paper 60 which is indicated in Fig. 13 as provided with graduations 61 which may indicate time and speed. The paper passes over a table 62 and the lead 59 bears upon this table as shown in Fig. 2. The paper 60 at one end is mounted on a reel 63 which, in turn, is mounted on a shaft 64.

The reel 63 is arranged between two plates 63′ which are arranged to slide within the casing as shown.

Engaging one end of the shaft 64 is a disc 65. This disc frictionally engages the end of the roll of paper to prevent accidental turning thereof. The disc 65 is forced into engagement with the paper by means of a spring 66, one end of which engages a cotter pin 67. To prevent the disc 65 from turning we mount a stop member 68 thereon which has an aperture therein which engages a pin 69 on one of the rails 63′. The shaft 64 is held in place by a nut 64$^a$ on the end which engages a collar 64$^b$, and pulls a shoulder 64$^c$ against the inner face of a rail 63′.

The paper 60 is wound upon a reel 70 mounted on a shaft 71 which at one end is provided with a gear 72 which is pinned to the shaft 71, see Fig. 9. A collar 73 surrounds the shaft and works in a recess in a wall of the rail 63′. The shaft 71 is provided with a square end 74 and this square end fits within a square hole in a disc 75. The disc 75 is secured to a lever 76 which is pivoted at 77 at one end to one rail 63′ and has an operating member 78 at the other end. The disc 75 is rotatably held in place by means of a washer 79 which engages a boss 79′ on the disc. The boss passes through a hole in the lever 76.

In order to take out the used portion of a roll of recording paper the lever 76 is first sprung outwardly so that the square end 74 on the shaft 71 is free. The reel 70 is then arranged in place and the lever 76 is moved to position so that a pin 79 (see Fig. 7) thereon fits within an aperture in the plate 63′. The construction described is such that when the gear 72 is turned the shaft 71 will be turned. The disc 75 will be turned due to the square end of the shaft fitting the square hole in the disc. The disc 75 is held against the end of the paper reel 70 by the lever 76 and as the shaft 71 rotates the reel 70 will be turned due to the frictional engagement of the disc 75 with the end of the reel. This engagement, however, is only strong enough to cause the paper to wind up on the reel 70 when there is slack present in the paper, the tension of the disc 75 against the reel is not sufficient to cause the paper to be unwound from the reel 63. To insert a new roll of paper a cotter pin 67 is removed after which the spring 66 and the disc 65 are removed. This done, a roll of paper is arranged on the shaft 64 and the disc 65, spring 66 and cotter pin 67 are replaced. The loose end of the paper is then drawn over the table 62 and over the roller 67 and the free end is inserted in the slit in roll 70.

In order to move the paper across the table 62, we provide a feed roll 80 which is mounted on a shaft 81. This shaft at one side is supported in a bearing 82 which is mounted to slide in a slot in a member 84 which is arranged on one side wall of the casing. The member 82 is adjustable in the slot by means of a screw 85 and a spring 86 so that the pressure of the feed roll 82 against an idle roll 87 may be closely adjusted.

The shaft 81 is provided with a gear 90 which is adapted to be driven by a gear 91 which is in turn adapted to be driven by a gear 92 pinned to a shaft 93 on which a sprocket 94 is pinned. The gear 92 also drives the gear 72 previously mentioned. The sprocket 94 is shown as driven by a chain 95 from a sprocket 96 on a shaft 97. On the shaft 97 is a sprocket 98 which is driven by a chain 99 from a sprocket 100. The sprocket 100 is arranged on a shaft 101 which is driven by a gear 102 from a gear 103 on the shaft 104 which drives the recording mechanism of the speedometer. This shaft 104 is driven from a worm 105 which is in turn driven from a worm 106 from the shaft 34 previously described. It will thus be apparent that the paper advancing means is driven from the same shaft 34 which operates the speedometer indicating and recording mechanism and that the amount of paper which passes the needle 59 and wound up on the reel 70 is directly proportional to the distance covered by the automobile equipped with our invention. On account of the fact that the reel 70 is frictionally held, this reel will merely wind up the paper advanced by the rolls 80 and 87 and the fact that the diameter of the reel 70 increases does not effect the speed of the paper fed by the pencil 59.

As stated the plates 63' slide within the casing. These plates are notched as at 110 to receive the shaft 81 previously mentioned. The plates 63' together with the two reels 70 and 63 are permanently held in position by means of the table 62 and by means of the end member 62' (see Fig. 10). The shaft 71 has the gear 72 permanently fixed thereon and when the plates 63' are inserted this gear 72 moves along in the space between the side wall 11 and the partition member 23 until the gear 72 strikes the gear 92 so that the teeth of the gears 72 and 92 mesh. The gears 90, 91 and 92 as well as the sprockets 94, 96 and 98 are permanently attached within the casing and these are not disturbed when the plates 63' are removed. The gear 72 is clearly shown in Fig. 5 as engaging the gear 92 in such manner that the gear 72 can easily move from the gear 92 when the gear 72 is bodily moved with the plates on which it is attached.

Mounted on a part of the flange 21 we show a lever 111 which is pivotally mounted at 112 and which is arranged directly above one of the plates 63'. This lever is provided with a pin 113 which is adapted to engage beneath a portion of the spring 55 so that when the pin 113 is raised the spring 55 will be moved vertically to lift the pencil 59 from the paper 60. To thus lift the pencil 59 we provide a cam surface 114 on the bottom of the lever 111. This cam surface is adapted to normally fit within a depression 115 in the top of the adjacent plate 63'. When the plates 63' are moved from the casing the cam surface 114 will be lifted by the adjacent portion of the plate thereby lifting the pencil from the paper. In a similar manner when the plates 63' are inserted the lever 111 will be lifted and will stay lifted until the cam surface 114 drops into the depression 115.

In operation, the lever 111 in its extreme upward position will occupy a position within a cover member 116 which is pivotally mounted at 117 and which is provided with a transparent panel 118 through which the speed recording pencil 59 and the record made thereby can be viewed.

The cover 116 may be held in place by a catch (not shown) and this cover can be operated by an operator to insert a new pencil. The cover also renders the table 62 accessible for the stamping or writing of the place, name, or date thereon or for any special markings which traffic officers or others might desire to make thereon.

We prefer to make the cross lines on the recording paper one half inch apart, and the paper preferably travels one half inch while the vehicle is traveling one mile. With this arrangement, by counting back on the record strip the previous performances of the vehicle could be determined. We preferably employ a roll of record paper which will record the speed for 6,000 miles or more so that one roll will last for a long time, thereby avoiding requirement for frequent changes of record paper.

Having thus described our invention, we claim:

1. In a device of the class described, a casing, a speed recording marker, a strip of paper, said marker normally engaging said strip, a pair of spaced plates on which said paper is mounted, a lever pivoted within said casing, means on said lever for engaging said marker, and means on said plates for engaging said lever to lift said marker when the plates and the paper thereon are being inserted in, or removed from, the casing.

2. In a recording speedometer, a record receiving strip, means engaging said strip for marking thereon, said means including a pencil, a sleeve in which said pencil is mounted, a hinged support for said sleeve, means to resiliently urge said sleeve in one direction, and fastening means for normally holding said supporting member in operative position but releasable to allow said supporting member to be moved.

3. In a recording speedometer, a casing, a speed recording device, including a marking member, a strip of paper on which said member is adapted to mark, a pair of reels on which said paper is wound, and supporting means for said reels, said supporting means including a pair of rails, said rails being mounted for movement into and out of the casing.

4. In a recording speedometer, a casing, a speed recording marker, a strip of paper, said marker normally engaging said strip, an arm on which said marker is mounted, means to move said arm and said marker, a pair of spaced plates on which said paper is mounted, a lever pivoted, means on said lever for engaging said marker, and means on said plates for engaging said lever to lift said marker when said plates and said paper thereon are being inserted in, or removed from, said casing.

5. In a recording speedometer, a casing, a record receiving strip, means to support said strip within said casing, a marker, means to resiliently urge said marker into engagement with said strip, an arm on which said marker is mounted, means to move said marker and means operable upon movement of said strip supporting means relative to said casing to move said marker out of engagement with said record receiving strip.

In testimony whereof, we hereunto affix our signatures.

ERNEST COOPER.
ALONZO S. PIPER.